United States Patent Office 3,514,602
Patented May 26, 1970

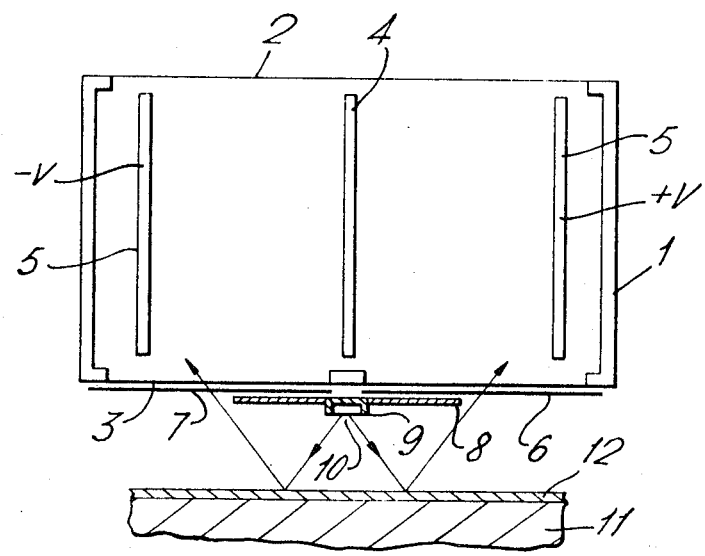

3,514,602
DIFFERENTIAL ION CHAMBERS
John Rathbone Rhodes, Austin, Tex., assignor to United Kingdom Atomic Energy Authority, London, England
Filed Dec. 16, 1966, Ser. No. 602,355
Claims priority, application Great Britain, Sept. 8, 1966, 40,108/66
Int. Cl. G01t 1/18
U.S. Cl. 250—83.6
2 Claims

ABSTRACT OF THE DISCLOSURE

A differential ion chamber has spaced positively and negatively polarized electrodes together with a substantially central collecting electrode. The chamber includes a front window giving access to the spaces enclosed by the collecting electrode, the other electrodes and a back window on the side of the spaces remote from the front window. A pair of balanced differential filters is provided, one associated with each half of the front window, whereby radiation passing through the first balanced filter enters the space between the first electrode and the collecting electrode, and similarly for the second balanced filter. A shield covers a substantially central portion of the front window, and has one or more sources mounted on the side thereof remote from such window.

---

The present invention relates to differential ion chambers.

It will be known that ion chambers are used to measure X-and gamma-radiation and the object of the present invention is to provide an improved ion chamber of the differential type. It should be explained that the differential type of ion chamber is provided with positive and negative electrodes together with a collecting electrode which collects charge which is proportional to the difference between the charge that would be collected by two separate chambers corresponding to the two halves of the differential ion chamber. In effect therefore a differential ion chamber may be used to measure this charge difference directly thus avoiding the difference computation. The arrangement of a differential ion chamber is particularly useful when differential filters are being used. The theory of differential filters is well known, but it may be convenient to refer to British Pat. 101,595 which defines differential filters. In essence differential filters are used in pairs and the filters are made of elements having closely adjacent absorption edges. In the simplest case a pair of differential filters as outlines above will be interposed sequentially between a target and an ion chamber, the difference between the separate outputs being computed. The result will be in effect to restrict the difference between the two outputs of the ion chamber to that due to a narrow pass band of energies which is selected to include the characteristic radiation, preferably the Kα radiation, of an element contained in the target and the quantity of which it is desired to measure by means of the radiation.

The theory and practice of thickness or mass per unit area measurement using ionising radiation is well known and no further discussion is believed to be necessary. However, the detailed description hereinafter explains one mode of use of the differential ion chamber of the present invention and analogous modes of use will be apparent to those skilled in the art.

According to the present invention there is provided a differential ion chamber having spaced positively and negatively polarised electrodes together with a substantially central collecting electrode, such ion chamber including a front window giving access to the spaces enclosed by the collecting electrode, the other electrodes and a back window on the side of the spaces remote from the front window, a pair of balanced differential filters, one associated with each half of the front window, whereby radiation passing through the first balanced filter enters the space between the first electrode and the collecting electrode and similarly for the second balanced filter, and a shield covering a substantially central portion of the front window having one or more sources mounted on the side thereof remote from such window.

It will be apparent that the ion chamber of the present invention is designed for backscatter geometry only, since the target which constitutes the sample must be located on the side of the source away from the ion chamber. The arrangement is such that the source irradiates the target with a suitable high energy substantially monochromatic X-radiation and some of this radiation is absorbed by the target and re-emitted as the characteristic radiation of the wanted element in the sample. It will be apparent that radiation will also be emitted by other elements present in the sample. However, the use of differential filters combined with a differential ion chamber effectively provides, in a single measuring operation, a pass band of energies so narrow that the arrangement discriminates against all other radiation except that due to the wanted element in the target.

Furthermore, it is possible to use a transparent back window to permit high energy radiation, that is to say, radiation of substantially higher energy than the characteristic radiation of the wanted element to escape from the chamber without contributing to the output.

The use of the extended sorce shield, that is to say a shield substantially larger than necessitated by the physical size of the source itself, is very advantageous in that in practice it improves the tolerance of the arrangement to the variations in the source-to-target distance. It will be apparent that this is important as extreme sensitivity to this distance can lead to serious error in the output measurement.

In order that the present invention may more readily be understood an embodiment of the same will now be described with reference to the accompanying drawing which is a diagrammatic section through a preferred embodiment.

Referring now to the drawing the device is arranged for the measurement of a hot dipped galvanised zinc coating on steel. As will be known, this is a measurement which will be frequently made in galvanising plants in order to control the thickness of zinc coating. It will also be known that zinc has a Kα X-ray energy of 8.638 kev. whilst iron has a Kα energy of 6.403 kev. The problem is to separate zinc radiation from the iron radiation in order that only the zinc radiation shall be measured.

To this end the ion chamber comprises a generally cylindrical body 1 made of a suitable material and closed at its rear end by a thin window 2 which is transparent to high energy radiation. In practice this window may comprise 0.25 mm. of aluminised plastic sheet such as "Melinex," an essentially similar front window 3 is also provided and in the preferred embodiment comprises 0.25 mm. of aluminised plastic sheet such as "Melinex." The ion chamber is provided with a central collecting electrode 4 from which the electrical output is taken and which is in the form of a generally diametrical plate, effectively dividing the ion chamber into two halves. Each half is provided with an electrode 5 of generally semi-cylindrical form and in operation the right-hand electrode 5 is connected to a positive source of voltage at about 100 volts whilst the left hand electrode 5 is connected to an equal but negative source of voltage. The ion chamber is filled with argon at a pressure of approximately 760 mms. of mercury.

Disposed in front of the window covering the right-hand section of the ion chamber is a filter 6 made of copper whilst disposed in front of the left-hand portion of the ion chamber is a filter 7 made of nickel. The filters 6 and 7 together constitute a pair of balanced differential filters and it will be understood that the K absorption edge of nickel is at 8.331 kev. whilst the K absorption edge of copper is at 8.980 kev. In consequence an effective pass band between these two energies is provided and it will be observed that this pass band includes the zinc K$\alpha$ X-ray energy but excludes the iron K$\alpha$ X-ray energy. In consequence the signal taken from the central electrode 4 of the ion chamber, which is the difference between the outputs in the two parts of the ion chamber and is thus the difference between the copper-filtered and nickle-filtered radiation, corresponds to the radiation due to the zinc excluding the radiation due to the iron.

Disposed in front of the filters 6 and 7 is a source shield 8 and in the centre of this source shield is mounted a source holder 9 containing one or more sources 10. It will be observed that the shield 8 is considerably larger than is necessary to mount the source holder 9 and the reason for this is to improve the tolerance of the device to variations in the source-target spacing. As shown in the drawing the target comprises a piece of steel 11 having thereon a thin surface coating of zinc 12. Clearly for and particular geometry the size of the shield 8 must be selected so as to be a compromise between obtaining insensitivity to source-target spacing and obtaining an adequate output through the unshielded portion of the front window.

In this particular arrangement the source 10 is an americium-241 source and use is made of the gamma radiation of this source at about 60 kev. This radiation readily penetrates the relatively thick zinc coating and so allows measurement of its thickness. Excitation of zinc K radiation is sufficiently efficient for an adequate signal to be received and of the iron radiation for the filters to be necessary. There is also a considerable intensity of back-scattered radiation at about 50 kev. which, although discriminated against by the filters, affects the signal to noise ratio of the instrument adversely. The transparency of the back window 2 results in a proportion of this unwanted high energy backscattered radiation passing through the ion chamber without being recorded as effective output, but this effect is much more significant with higher energy unwanted radiation.

I claim:
1. A differential ion chamber comprising a body, a front window to said body, said front window being more transparent to radiation than said body, a substantially central collecting electrode dividing said body and said front window into two halves, a positively polarised electrode to one side of said central electrode, a negatively polarised electrode to the other side of said central electrode, a pair of balanced differential filters, filter mounting means locating said filters respectively in front of each half of the front window, an extended radiation-opaque shield covering a substantially central portion of the front window, and a radioactive source mounted centrally on the side of the shield remote from the front window.

2. The ion chamber of claim 1 further including a back window transparent to unwanted high energy radiation from the source backscattered from a target.

References Cited

UNITED STATES PATENTS

| | | | |
|---|---|---|---|
| 3,030,512 | 4/1962 | Harker | 250—83.6 |
| 3,335,277 | 8/1967 | Schmid et al. | 250—83.6 X |

RALPH G. NILSON, Primary Examiner

D. L. WILLIS, Assistant Examiner

U.S. Cl. X.R.

250—86; 313—93